United States Patent [19]

Huang

[11] Patent Number: 5,617,304

[45] Date of Patent: Apr. 1, 1997

[54] COMBINATION OF LASER POINTER AND BALLPOINT PEN

[76] Inventor: Chaochi Huang, 9F, No.185, Ta Tung Rd., Sec. 1, Hsi Chih Chen, Taipei Hsien, Taiwan

[21] Appl. No.: 594,468

[22] Filed: Jan. 31, 1996

[51] Int. Cl.⁶ .................................................. B43K 29/10
[52] U.S. Cl. .......................................... 362/118; 362/259
[58] Field of Search ................................... 362/118, 253, 362/259, 800, 109

[56] References Cited

U.S. PATENT DOCUMENTS

| | | | |
|---|---|---|---|
| 5,193,897 | 3/1993 | Halsey | 362/118 |
| 5,307,253 | 4/1994 | Jehn | 362/118 X |

Primary Examiner—Stephen F. Husar
Attorney, Agent, or Firm—Morton J. Rosenberg; David I. Klein

[57] ABSTRACT

A combination of laser pointer and ballpoint pen which includes a ballpoint pen mounting unit, which has a barrel and an ink cartridge inside the barrel, and a laser pointer mounting unit fastened to the barrel and turned relative it to move the ink cartridge in and out of the barrel, the laser pointer mounting unit having a battery set and a semiconductor laser module on the inside, and a press button on the outside controlled to electrically connect the battery set to the semiconductor laser module, causing the semiconductor laser module to emit a laser beam through a transparent end cap at one end of the laser pointer unit remote from the ballpoint mounting unit.

4 Claims, 3 Drawing Sheets

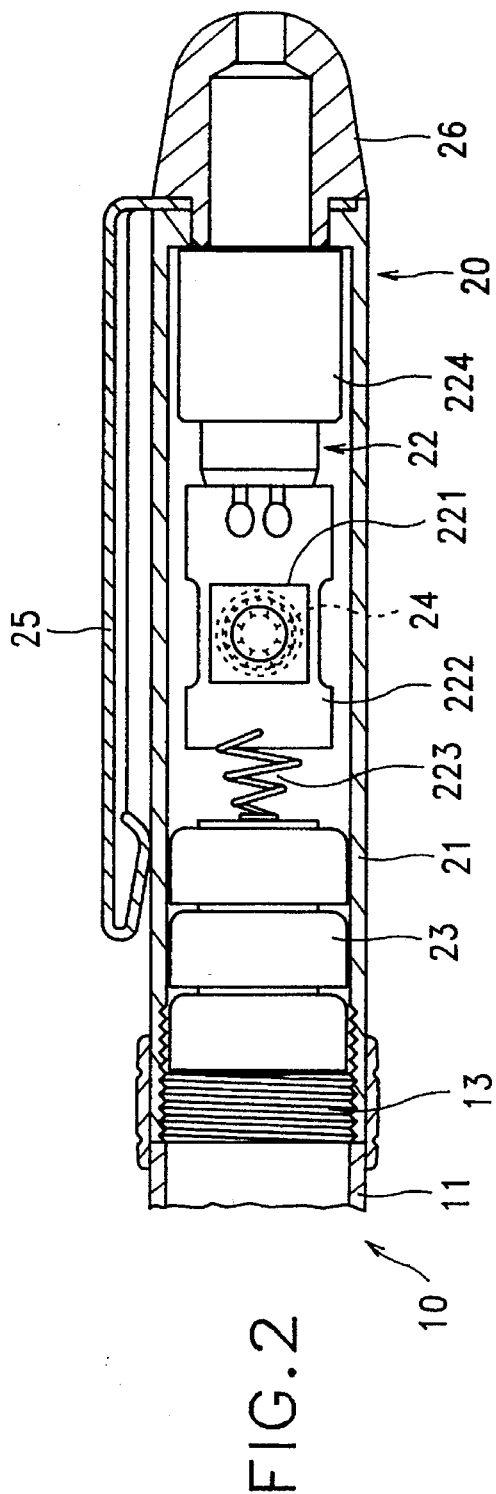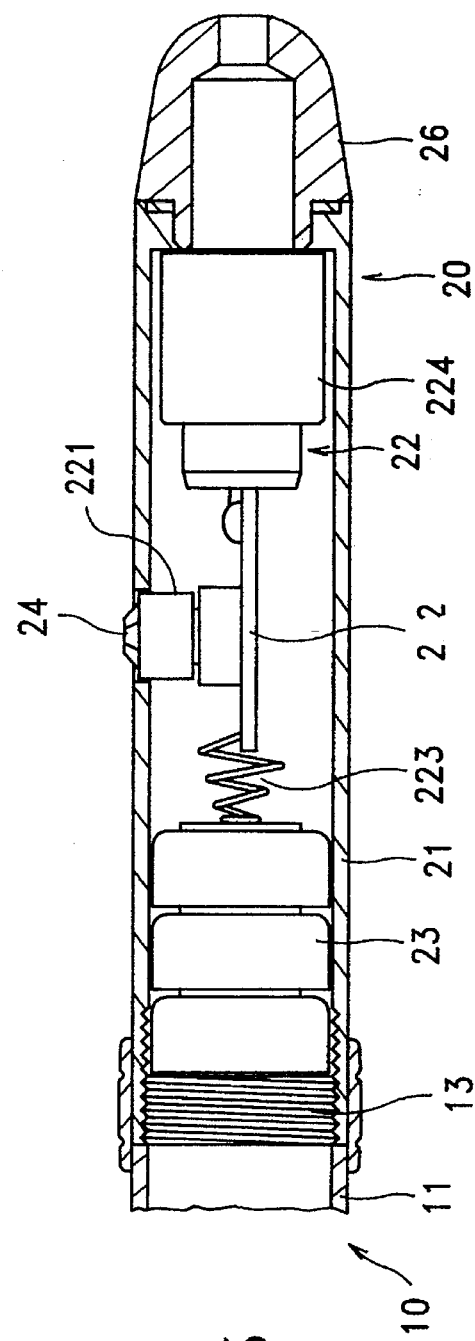

COMBINATION OF LASER POINTER AND BALLPOINT PEN

BACKGROUND OF THE INVENTION

The present invention relates to a combination of laser pointer and ballpoint pen which comprises a ballpoint pen at one end, and a laser pointer at an opposite end.

Various pen-like laser pointers have been disclosed for use to emit a laser beam for pointing things out on a map, blackboard, etc., and have appeared on the market. These laser pointers are shaped like a pen only, but cannot be used as a pen for writing.

SUMMARY OF THE INVENTION

It is one object of the present invention to provide a combination of laser pointer and ballpoint pen which can be used as a laser pointer as well as a ballpoint pen. It is another object of the present invention to provide a combination of laser pointer and ballpoint pen which can be conveniently carried on one's pocket. According to one aspect of the present invention, the combination of laser pointer and ballpoint pen comprises a ballpoint pen mounting unit, which has a barrel and an ink cartridge inside the barrel, and a laser pointer mounting unit fastened to the barrel and turned relative it to move the ink cartridge in and out of the barrel, the laser pointer mounting unit having a battery set and a semiconductor laser module on the inside, and a press button on the outside controlled to electrically connect the battery set to the semiconductor laser module, causing the semiconductor laser module to emit a laser beam out of a transparent end cap at one end of the laser pointer mounting unit remote from the ballpoint mounting unit. According to another aspect of the present invention, a clip is fixed to the laser pointer mounting unit for fastening.

BRIEF DESCRIPTION OF THE DRAWINGS

FIG. 2 is a top view in section of the laser pointer mounting unit of the combination of laser pointer and ballpoint pen shown in FIG. 1;

FIG. 3 is a side view in section of the laser pointer mounting unit of the combination of laser pointer and ballpoint pen shown in FIG. 1.

DETAILED DESCRIPTION OF THE PREFERRED EMBODIMENT

Figure 1:
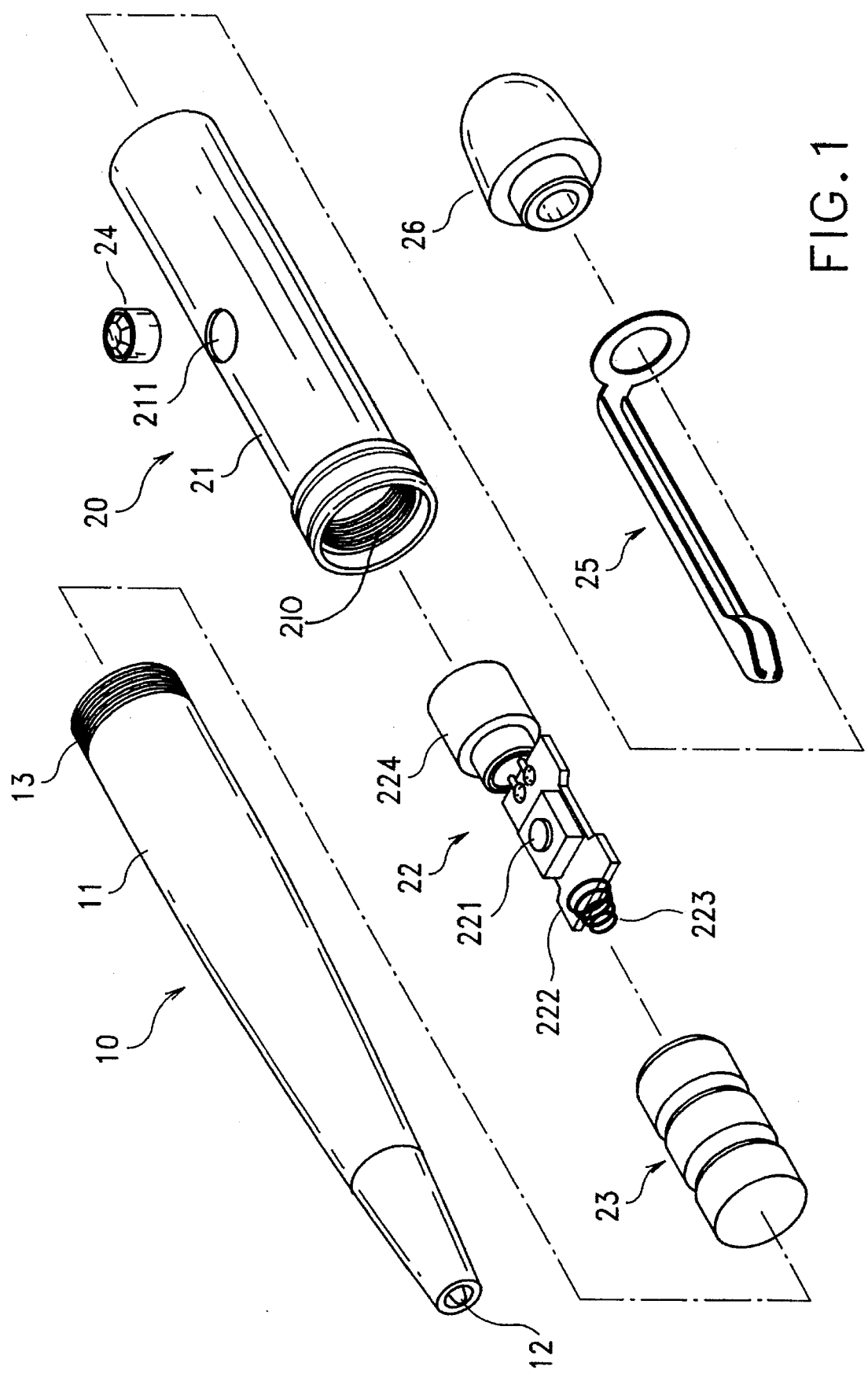
FIG. 1 is an exploded view of the combination of laser pointer and ballpoint pen according to the preferred embodiment of the present invention.
Figure 4:
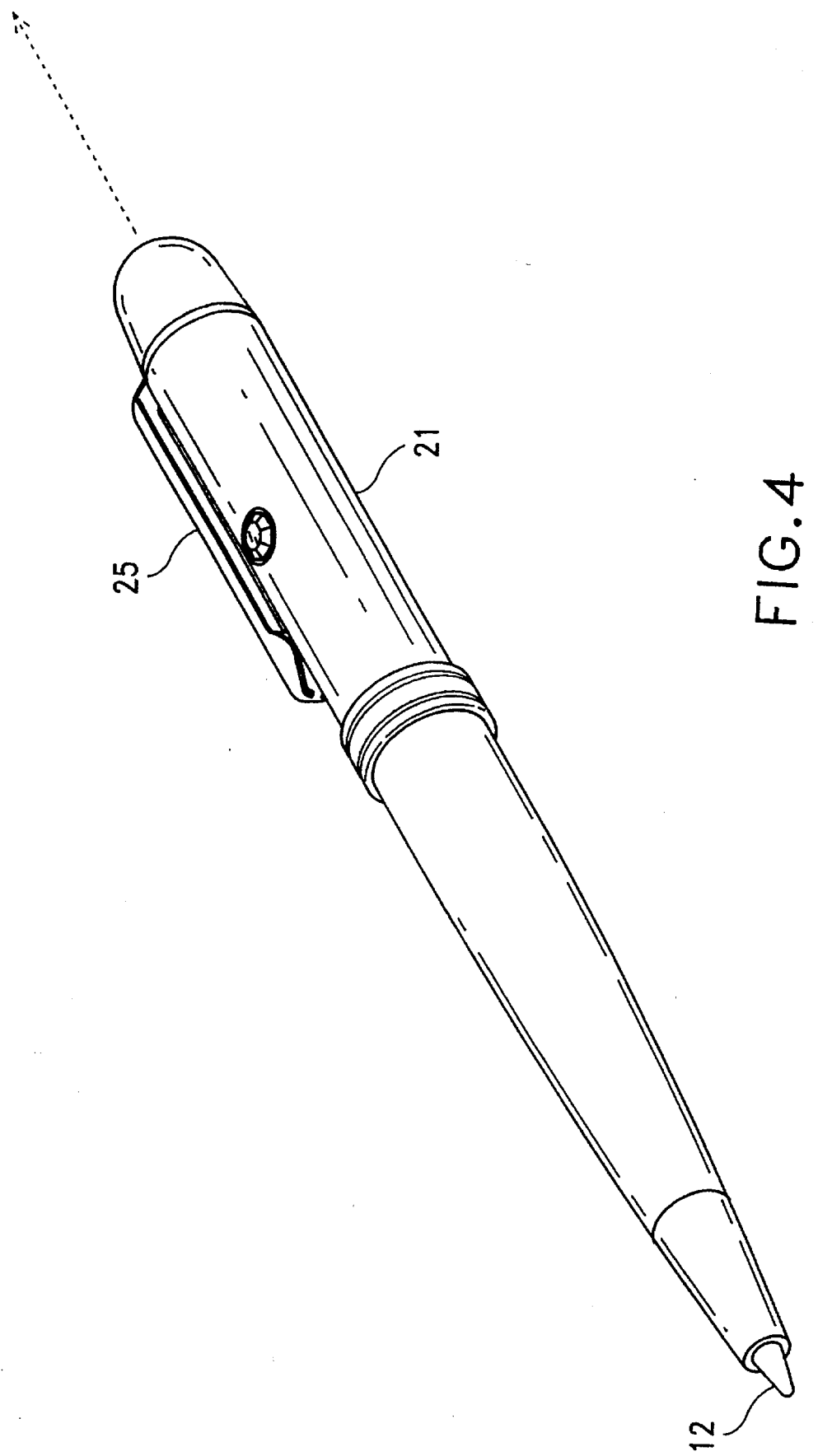
FIG. 4 is an elevational view of the combination of laser pointer and ballpoint pen according to the preferred embodiment of the present invention.

Referring to FIGS. 1, 2, 3, and 4, a combination of laser pointer and ballpoint pen in accordance with the preferred embodiment of the present invention is generally comprised of a ballpoint pen mounting unit 10, and a laser pointer mounting unit 20. The ballpoint pen mounting unit 10 comprises a metal barrel 11 having an outer thread 13 at one end, and an ink cartridge 12 moved in and out of the opposite end of the metal barrel 11 remote from the outer thread 13.

The laser pointer mounting unit 20 comprises a cylindrical metal shell 21 having an inner thread 210 at one end and a side hole 211 in the middle, a battery set 23 and a semiconductor laser module 22 mounted within the cylindrical metal shell 21, a gemstone-like press button 24 mounted within the side hole 211 of the cylindrical metal shell 21, a clip 25 fastened to the cylindrical metal shell 21 in a parallel relation, and a transparent end cap 26 fastened to one end of the cylindrical metal shell 21 remote from the inner thread 210 to secure the clip 25 in place. The semiconductor laser module 22 comprises a switch 221 disposed adjacent to the press button 24, a circuit board 222, a laser beam generating diode 224 connected to the circuit board 222, and a metal contact spring 223 connected to the circuit board 222 and disposed in contact with one end of the battery set 23.

Referring to FIGS. 2, 3, and 4 again, during the assembly process of the combination of laser pointer and ballpoint pen, the outer thread 13 is threaded into the inner thread 210 of the cylindrical metal shell 20, the press button 24 is mounted within the side hole 211 of the cylindrical metal shell 21, the transparent end cap 26 is fastened to one end of the cylindrical metal shell 21 remote from the metal barrel 11 to hold the clip 25 in place, the semiconductor laser module 22 is mounted inside the cylindrical metal shell 21 with the laser generating diode 224 disposed adjacent to the transparent end cap 26, and the battery set 23 is mounted within the cylindrical metal shell 21 and having one end connected to one end of the switch 221 through the metal contact spring 223 and an opposite end connected to the opposite end of the switch 221 through the metal barrel 11 and the cylindrical metal shell 21. There is also provided a conventional propelling mechanism (not shown) controlled by the rotary motion of the cylindrical metal shell 21 relative to the metal barrel 11 to extend the ink cartridge 12 out of the metal barrel 11 or to retract it into the inside of the metal barrel 11. When the press button 24 is depressed, the battery set 23 is electrically connected to the laser generating diode 224, causing it to emit a laser beam through the transparent end cap 26.

It is to be understood that the drawings are designed for purposes of illustration only, and are not intended as a definition of the limits and scope of the invention disclosed.

I claim:

1. A combination of laser pointer and ballpoint pen, comprising:

a ballpoint pen mounting unit (10), said ballpoint pen mounting unit (10) comprising a metal barrel (11) having a top end, a bottom end, an outer thread (13) made around said top end, and an ink cartridge (12) moved in and out of said bottom end; and a laser pointer mounting unit (20) fastened to the top end of the metal barrel (11) of said ballpoint pen mounting unit (10), and turned relative to said ballpoint pen mounting unit (10) to move said ink cartridge (12) in and out of the bottom end of the metal barrel (11) of said ballpoint pen mounting unit (10), said laser pointer mounting unit (20) comprising a cylindrical metal shell (21) having an inner thread (210) at one end threaded onto the outer thread (13) of the metal barrel (11) of said ballpoint pen mounting unit (10) and a side hole (211), a transparent end cap (26) fastened to one end of said cylindrical metal shell (21) remote from said ballpoint pen mounting unit (10), a semiconductor laser module (22) mounted in said cylindrical metal shell (21) adjacent to said transparent end cap (26), a battery set (23) mounted in said cylindrical metal shell (21), and a press button (24) controlled to electrically connect said battery set (23) to said semiconductor laser module (22), causing said semiconductor laser module (22) to emit a laser beam through said transparent end cap (26).

2. The combination of laser pointer and ballpoint pen of claim 1 wherein said press button (24) is shaped like a gemstone.

3. The combination of laser pointer and ballpoint pen of claim 1 further comprising a clip (25) fastened to said cylindrical metal shell (21) by said transparent end cap (26).

4. The combination of laser pointer and ballpoint pen of claim 3 wherein said clip (25) is disposed in parallel to said cylindrical metal shell (21).

* * * * *